US007646972B2

(12) United States Patent
Dunko et al.

(10) Patent No.: US 7,646,972 B2
(45) Date of Patent: Jan. 12, 2010

(54) METHOD AND APPARATUS FOR CAPTURING MULTIPLE IMAGES AT DIFFERENT IMAGE FOCI

(75) Inventors: Gregory A. Dunko, Cary, NC (US); Yojak H. Vasa, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 352 days.

(21) Appl. No.: 11/608,517

(22) Filed: Dec. 8, 2006

(65) Prior Publication Data

US 2008/0138055 A1 Jun. 12, 2008

(51) Int. Cl.
*G03B 13/34* (2006.01)
*G03B 3/10* (2006.01)

(52) U.S. Cl. ........................ 396/121; 348/345
(58) Field of Classification Search ................. 396/89, 396/133, 154; 348/345
See application file for complete search history.

(56) References Cited

U.S. PATENT DOCUMENTS

| 4,982,217 | A  | * | 1/1991  | Aihara         | 396/121 |
| 2001/0026683 | A1 | * | 10/2001 | Morimoto et al. | 396/89  |
| 2004/0070679 | A1 |   | 4/2004  | Pope           |         |
| 2005/0014493 | A1 | * | 1/2005  | Ford           | 455/418 |
| 2005/0089208 | A1 | * | 4/2005  | Dong et al.    | 382/133 |
| 2006/0007346 | A1 | * | 1/2006  | Nakamura et al.| 348/362 |
| 2006/0061678 | A1 | * | 3/2006  | Yamazaki       | 348/349 |
| 2006/0197849 | A1 |   | 9/2006  | Wemersson      |         |
| 2006/0198623 | A1 | * | 9/2006  | Ono            | 396/89  |
| 2006/0232682 | A1 | * | 10/2006 | Ono            | 348/222.1 |

OTHER PUBLICATIONS

WIPO International Preliminary Report on Patentability for PCT/US2007/077053.*
International Search Report with Written Opinion, International Application No. PCT/US2007/077053, Mailing Date: Dec. 13, 2007.

* cited by examiner

*Primary Examiner*—W. B. Perkey
*Assistant Examiner*—Leon W. Rhodes
(74) *Attorney, Agent, or Firm*—Coats & Bennett, P.L.L.C.

(57) ABSTRACT

A camera described herein captures a plurality of images at different focus settings to improve the probability that the camera captures a clear representation of a desired object in a potentially ambiguous scene. According to one exemplary embodiment, the camera selects a plurality of focus settings corresponding to different focal points in a range of focal points. Subsequently, the camera automatically captures successive images of the scene at the selected focus settings in response to a single activation of a shutter control. The user may select one or more of the captured images for storage, transmission to a remote device, and/or further processing.

32 Claims, 5 Drawing Sheets

METHOD AND APPARATUS FOR CAPTURING MULTIPLE IMAGES AT DIFFERENT IMAGE FOCI

BACKGROUND

The present invention relates generally to wireless communication devices having a built-in camera, and more particularly, to image capturing features of such devices.

In recent years, wireless communication devices with built-in cameras have become increasingly popular. One such device, referred to herein as a camera phone, combines a cellular telephone and digital camera into a single device. Consumers may use camera phones to capture images, send and receive digital images, and/or participate in a video teleconference.

Camera phones are particularly useful for capturing unexpected events that occur when other types of cameras are not readily available. For example, while at a playground a mother may see her child walk for the first time. In another example, old friends may run into each other at the mall. In still another example, a dog owner may be amused by a puppy's behavior at a park. In all of these examples, the participants may wish to capture a snapshot of the event. While a camera phone may easily capture a still snapshot of a group of friends, conventional camera phones may have difficulty capturing a clear snapshot of a moving object, such as a child or pet, and/or of a desired object in an ambiguous scene having multiple objects.

SUMMARY

The present invention comprises a camera that captures a plurality of images in succession at different focus settings responsive to activation of a shutter control to improve the probability that the camera captures a clear representation of a desired object in a potentially ambiguous scene. The selected focus settings correspond to focal points within a range of focal points. The range of focal points may be preset by the manufacturer or by the user. Alternatively, the range of focal points may be dynamically chosen by analyzing a scene to dynamically select objects of interest, and selecting the range of focal points to include the focal points associated with the selected objects. In one embodiment of the invention, the selected focus settings correspond to N equally spaced focal points in the selected range of focal points. In other embodiments, the focus settings correspond to focal points associated with potential objects of interest.

DETAILED DESCRIPTION

The invention described herein improves the utility of cameras by automatically capturing a plurality of images at different focus settings in succession responsive to a single activation of a camera shutter control. The camera may comprise a stand-alone camera or may be incorporated into a portable electronic device, such as a cellular telephone, personal data assistant, etc.

Figure 1:
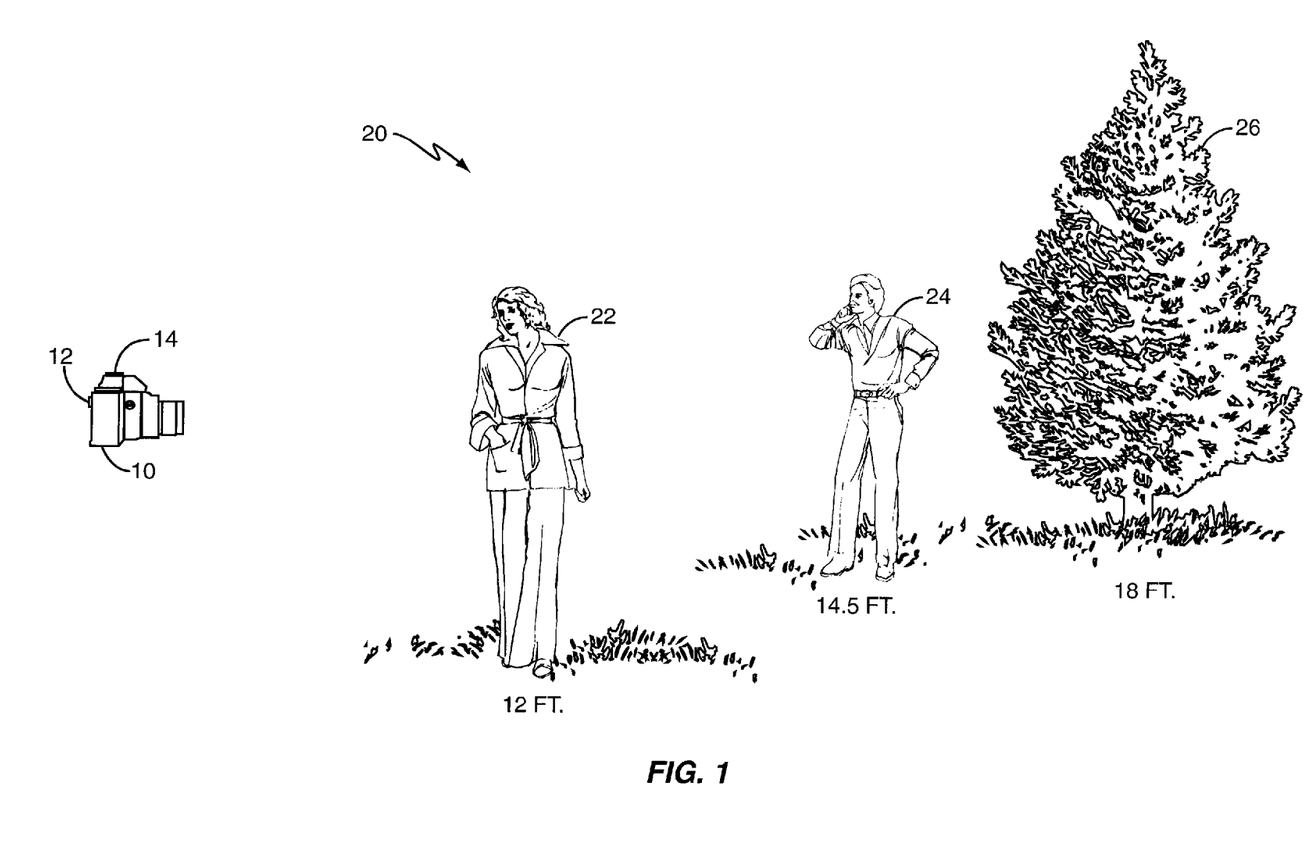
FIG. 1 shows a camera according to one embodiment in an exemplary park setting.

FIG. 1 shows an exemplary camera 10 aimed at a park scene 20. Camera 10 includes a viewfinder 12 and a shutter control 14. Viewfinder 12 enables the user to view the scene 20 as imaged by the camera 10. Responsive to a single activation of the shutter control 14, the camera 10 captures multiple successive images of the scene 20 as it appears in the viewfinder 12, where each image is focused on a different portion of the scene 20. Camera 10 may include processing logic to analyze at least a portion of a scene 20 visible in the viewfinder 12, such as a central portion, and to identify potential objects of interest within the scene 20.

Figure 2:
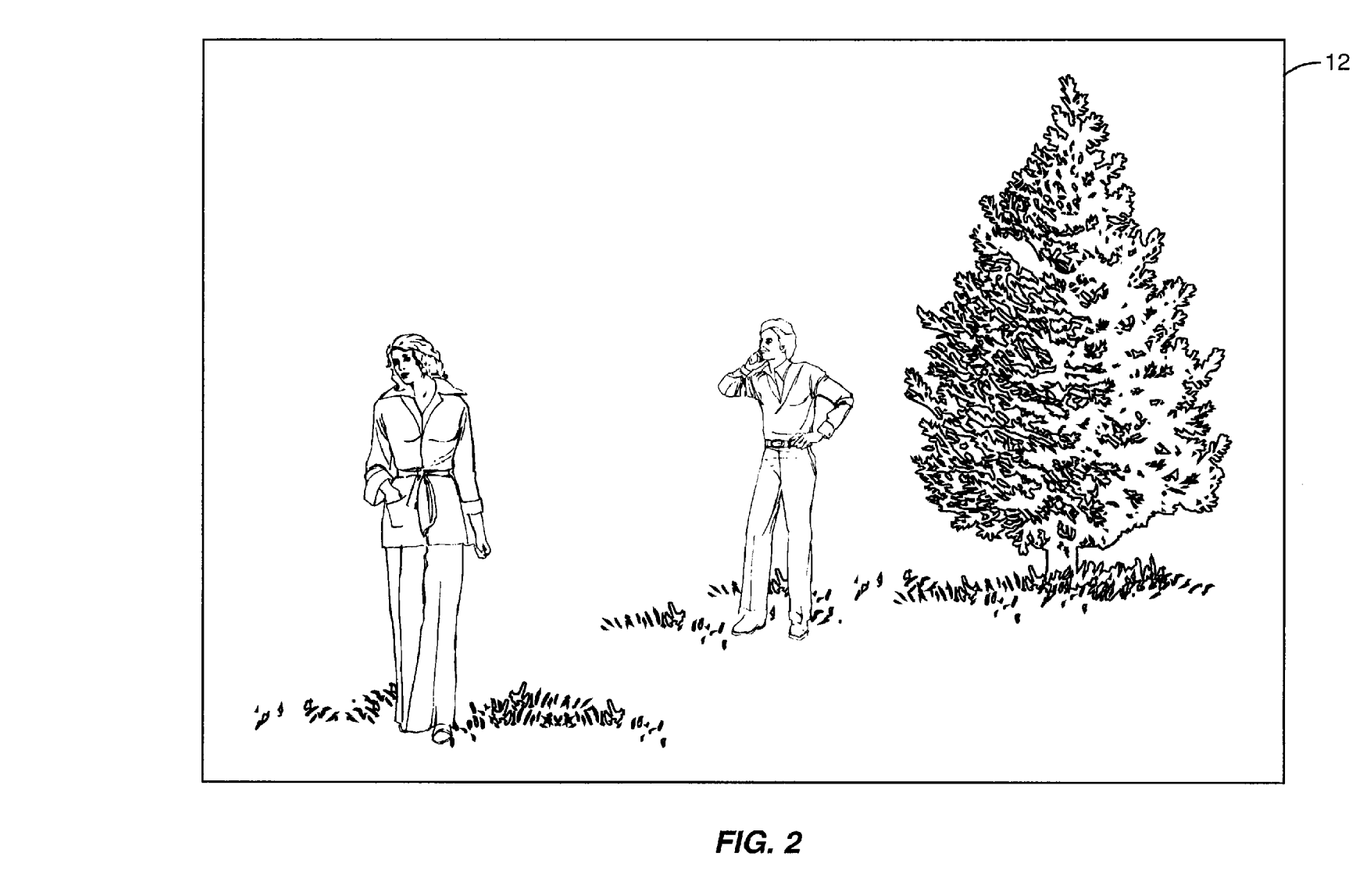
FIG. 2 shows an exemplary scene imaged by the camera.

FIG. 2 shows one view of the park scene 20 as it appears in the viewfinder 12. In FIG. 2, the scene 20 comprises three objects: two people 22, 24 in front of a tree 26 in a park. The distance from each object to the camera 10 is different. In this example, person 22 is 12 ft. from the camera 10, person 24 is 14.5 ft. from the camera 10, and the tree 26 is 18 ft. from the camera 10. A conventional camera has no way to determine which of the three objects 22, 24, 26 represents the object of interest to the user. Most cameras will automatically focus on an object in the center of a scene 20, which may not be the object of interest to the user. In this case, the object of interest may not be focused in the captured image.

According to the present invention, camera 10 captures multiple successive images of a scene 20 with different focus settings responsive to a single actuation of the shutter control 14 to improve the likelihood of capturing an image focused on the object of interest. When the shutter control 14 is pressed, the camera selects a plurality of focus settings corresponding to different focal points within a range of focal points, and captures multiple images in succession at the selected focus settings.

Figure 3A:
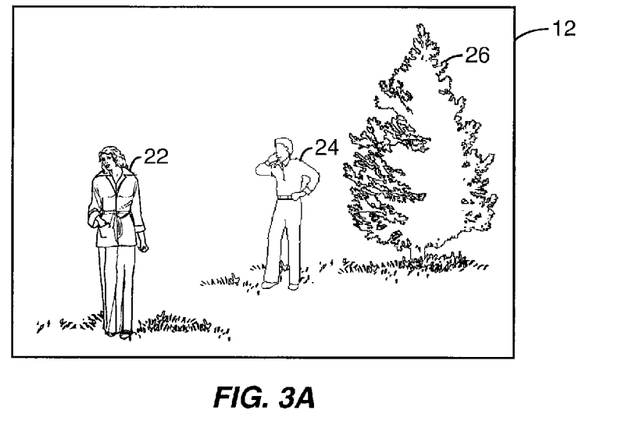
FIGS. 3A-3C show exemplary images captured by the camera in succession according to one embodiment of the present invention.
Figure 3B:
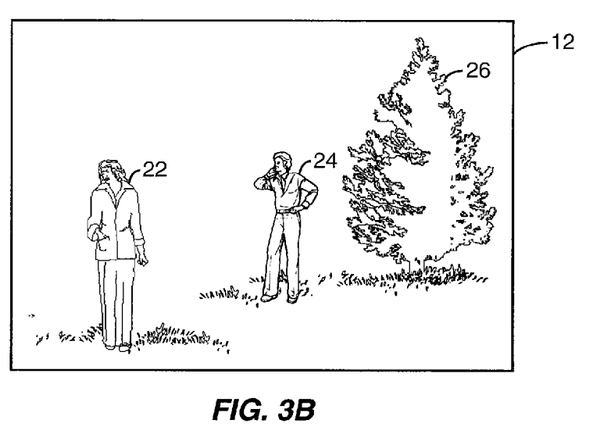
Figure 3C:
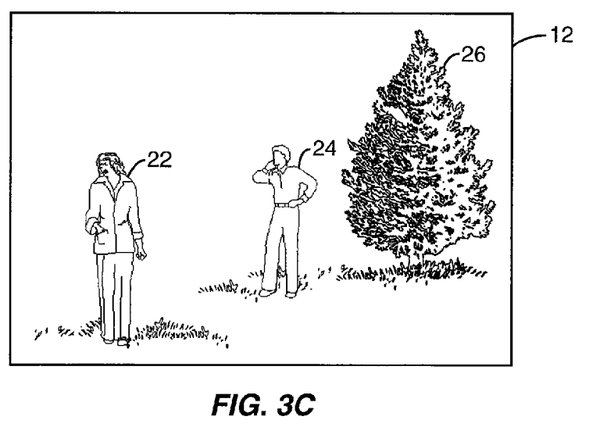

FIGS. 3A-3C illustrate three images captured by the camera 10 at three different focus settings. The first image (FIG. 3A) focuses on the near person 22. The second image (FIG. 3B) focuses on the far person 24. The third image (FIG. 3C) focuses on the tree 26. The three images can be displayed to the user on a display to allow the user to select a desired image, or alternatively, can be stored in memory.

Figure 4:
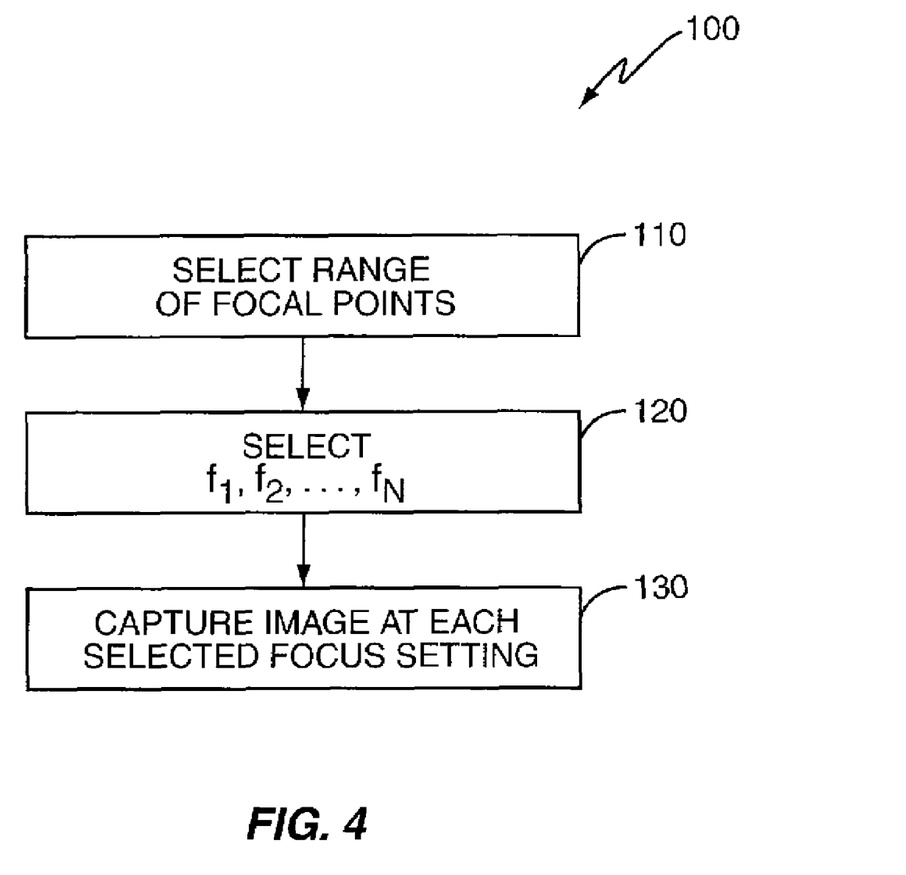
FIG. 4 shows a flow chart of an exemplary process according to the present invention.

An image capture process according to an exemplary embodiment of the present invention is shown in FIG. 4. When the shutter control 14 is pressed, the camera 10 selects a range of focal points (bock 110), determines multiple focus settings $\{f_1, f_2, \ldots f_N\}$ corresponding to focal points in the range of focal points (block 120), and captures images at each of the selected focus settings (block 130). The selection of a range of focal points may be either explicit or implicit. When the range is explicitly selected, the selection will occur before the selection of focal points or focus settings. In the implicit case, the selection of focus settings or focal points implicitly defines a range.

In some embodiments, the range of focal points may be a fixed range determined by the user or preset by the manufacturer. The fixed range may comprise a fixed range (e.g. 6 ft.) with defined boundaries (5 ft. and 11 ft.), or may comprise a fixed range (e.g. 6 ft.) with undefined boundaries. In the first case, the bounding focal points may be set by the user or preset by the manufacturer. In the second case, the bounding focal points may be selected by the user or may be selected by the camera 10 based on an analysis of the scene 20.

In another embodiment, the range of focal points may be variable and may be dynamically selected based on an analysis of at least a portion of the scene 20. The camera 10 may select the range of focal points to include one or more focal points associated with the identified objects. For the scene 20 in FIG. 2, camera 10 may dynamically select a range of focal points between 11 ft. and 19 ft. to encompass the focal points associated with the objects 22, 24, 26. This increases the probability that the focal points associated with objects moving towards the camera or away from the camera 10 will still be included in the range of focal points. It will be appreciated that the range of focal points may alternatively be selected such that the focal points associated with two selected objects bound the range of focal points. For example, the camera 10 may bound the range of focal points by the focal point associated with the nearest object and the farthest object.

Once a range is selected, camera 10 selects desired focus settings corresponding to two or more focal points in the selected range of focal points. The focus settings may correspond to either fixed or variably spaced focal points. In one embodiment, camera 10 selects focus settings corresponding to a plurality of uniformly spaced focal points within the focal range. For example, the camera 10 may select focus settings $\{f_1, f_2=f_1+\Delta, \ldots f_N=f_{N-1}+\Delta\}$ corresponding to N uniformly spaced focal points within the range of focal points, where N may be user-selected or preset by the manufacturer.

To illustrate this embodiment, consider the exemplary scene 20 shown in FIG. 2. Camera 10 may select focus settings corresponding to N=5 equally spaced focal points within a range of focal points that includes the focal points associated with the near person 22 and the tree 26 in FIG. 2. For example, camera 10 may select focus settings in the 10-18 ft. range corresponding to 10 ft., 12 ft., 14 ft., 16 ft., and 18 ft. focal points. Responsive to a single activation of shutter control 14, the camera captures N=5 images of the scene 20 at each of the 5 selected focus settings.

In another exemplary embodiment, camera 10 may select the focus settings $\{f_1, f_2, \ldots f_N\}$ corresponding to the focal points associated with each of a plurality of objects in the scene 20. For the example shown in FIG. 2, a camera 10 according to this embodiment may select three focus settings corresponding to each of the 12 ft., 14.5 ft., and 18 ft. focal points associated with the three objects 22, 24, 26 in the scene 20.

In another exemplary embodiment, camera 10 may select the plurality of focus settings $\{f_1, f_2, \ldots f_N\}$ corresponding to a plurality of focal points that are uniformly or variably clustered around different focal points within the range of focal points. For example, the camera 10 may uniformly or variably cluster a plurality of focus settings around a reference focus setting $f_{Rn}$ corresponding to the 12 ft. focal point associated with the near person 22 in FIG. 2. The resulting focus settings may be uniformly clustered relative to the reference focus setting $f_{Rn}$, i.e., $\{f_{Rn}-2\Delta, f_{Rn}-\Delta, f_{Rn}, f_{Rn}+\Delta, f_{Rn}+2\Delta\}$, or $\{f_{Rn}, f_{Rn}+\Delta, f_{Rn}+2\Delta\}$. Alternatively, the focus settings may be variably clustered relative to the reference focus setting $f_{Rn}$, i.e., $\{f_{Rn}-\Delta_1, f_{Rn}-\Delta_2, f_{Rn}, f_{Rn}+\Delta_3, f_{Rn}+\Delta_4\}$. It will be appreciated that camera 10 may cluster a plurality of focus settings relative to multiple reference focus settings.

After selecting the focus settings, camera 10 captures an image of the scene 20 at each of the selected focus settings. While not required, the camera 10 may simultaneously or sequentially display the captured images to enable the user to review and select desired ones of the captured images. The selected images may be stored, transmitted to a remote device, and/or otherwise processed.

Figure 5:
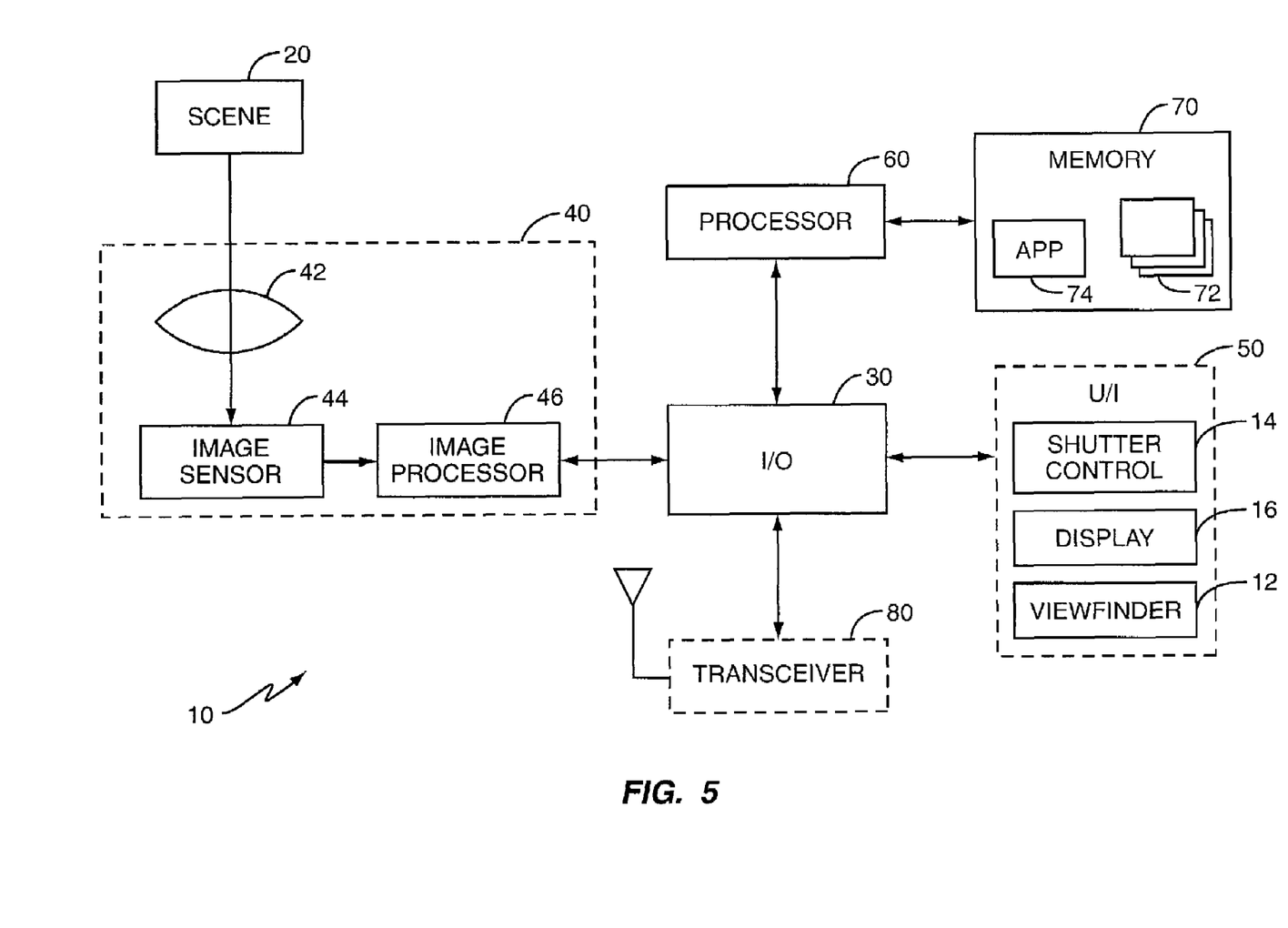
FIG. 5 shows a block diagram of an exemplary camera according to the present invention.

FIG. 5 shows a block diagram of one exemplary camera 10 according to the present invention. Camera 10 comprises an input/output circuit 30 that interfaces an imaging circuit 40, a user interface 50, a processor 60, and an optional transceiver 80. Imaging circuit 40 comprises an optical lens system 42, image sensor 44, and image processor 46. Optical lens system 42 images a portion of scene 20 by collecting and projecting light from the scene 20 onto the image sensor 44. It will be appreciated that lens system 42 may comprise any type of imaging lens system, including fixed focal length and zoom lens systems. Image sensor 44 senses the light and converts the intensity of the sensed light into an output electrical signal. The image sensor 44 may be any conventional image sensor, such as a charge-coupled device (CCD) or complementary metal oxide semiconductor (CMOS) image sensor. Image processor 46 processes the raw image data collected by the image sensor 44 according to any known means. In some embodiments, image processor 46 may execute any known digital zoom function.

User interface 50 provides a means for the user to interact with and control the camera 10. The user interface 50 includes viewfinder 12, shutter control 14, and a display 16. It will be appreciated that user interface 50 may include other interface components not explicitly illustrated in FIG. 4. Viewfinder 12 enables the user to view a scene 20 imaged by imaging circuit 40. Display 16 allows the user to see dialed digits, images, menu options, and other service information. Shutter control 14 activates the image capturing operations of imaging circuit 40. It will be appreciated that while display 16 and viewfinder 12 are shown as separate elements, display 16 may function as the viewfinder 12.

Processor 60 controls the operation of camera 10 according to programs stored in memory 70. The memory may also include buffers 72 used to temporarily store the captured images. In addition, processor 60 may include logic for analyzing the scene 20 imaged by the imaging circuit 40 to identify objects of interest and/or identify one or more focal points associated with the objects of interest.

The logic in processor 60 may analyze the image based on any known technique. For example, processor 60 may include auto focus logic that identifies each object of interest. The auto focus logic may comprise an active auto focus feature that analyzes at least a portion of the scene 20 to measure the distance between the camera 10 and the objects of interest. The processor 60 may select a focal point corresponding to the measured distance for each object of interest. Alternatively, the auto focus feature may comprise a passive auto focus feature that analyzes phase and/or contrast information of the imaged scene 20 to select the focal point for each object of interest based on the phase and/or contrast analysis. As with the active auto focus feature, the processor 60 selects a focal point for each object of interest. In any event, processor 60 may select a range of focal points and/or a plurality of focus settings based on the focal points selected by either the active or passive auto focus features. It will be appreciated that processor 60 may use other analysis techniques not explicitly described herein.

Processor 60 also controls the imaging circuit 40 to set the focus of the optical lens system 42 to the selected focus settings. Processor 60 may also execute one or more imaging applications 74 stored in memory 70 to further process the captured images. Exemplary applications 74 include any known image manipulation applications that, for example, compress the image or otherwise modify the image responsive to user input.

Transceiver 80 is a fully functional cellular radio transceiver that transmits and receives wireless signals. The transceiver 80 may comprise a long-range transceiver that operates according to any known standard, including the standards known generally as the Global System for Mobile Communications (GSM®), TIA/EIA-136 [trade], cdmaOne [trade], CDMA2000®, UMTS [trade], WiMax [trade], and Wideband CDMA [trade]. Alternatively or in addition, transceiver 80 may comprise a short-range transceiver that operates according to any known short-range communication standard, such as Bluetooth® and WiFi [trade]. It will be appreciated that transceiver 80 is only included in those devices that also function as wireless communication devices.

The above describes how a camera 10 may capture multiple images at different focus settings responsive to a single activation of shutter control 14 when a camera 10 operates in a multiple focus camera mode. The user may enter or exit the multiple focus camera mode when desired by inputting the appropriate commands using one or more components of user interface 50. Alternatively, the user may select the multiple focus mode as a default camera operating mode.

It will be appreciated that each object in a scene 20 has a focal range. As used herein, the focal range of a given object refers to a distance about the focal point associated with the given object that produces a sharp, in focus image of the given object. For example, the near person 22 in scene 20 may have a focal range between 11.5 ft. and 12.5 ft. Thus, it will be appreciated that the selected focus settings for near person 22 may correspond to any focal point within the 11.5-12.5 ft. focal range of the near person 22.

It will further be appreciated that the present invention enables a camera 10 or other camera device to automatically capture multiple images of a potentially ambiguous scene at different focus settings responsive to a single activation of a camera shutter control 14. This increases the probability that the camera 10 will capture a desired image focused on a desired object, even when the scene 20 is in motion and/or when the scene 20 has several objects.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of capturing images of a scene with a camera, the method comprising:
   analyzing at least a portion of the scene to identify two or more objects of interest in the scene;
   selecting at least one focus setting for each of the identified objects, wherein the selected focus settings correspond to different focal points in a range of focal points;
   capturing a plurality of successive images of the scene at said selected focus settings in response to a single activation of a shutter control
   simultaneously or sequentially displaying each of the captured images on a display; and
   selecting at least one of the displayed images based on user input.

2. The method of claim 1 further comprising selecting the desired range of focal points.

3. The method of claim 2 wherein selecting the desired range of focal points comprises:
   analyzing at least a portion of the scene to dynamically select objects of interest; and
   selecting the desired range of focal points to include the focal points associated with the objects of interest.

4. The method of claim 3 wherein a first selected focal point corresponds to a nearest object, and wherein a second selected focal point corresponds to a farthest object.

5. The method of claim 1 wherein the desired range of focal points comprises a predetermined range of focal points having a fixed width and predetermined end focal points.

6. The method of claim 1 wherein the desired range of focal points comprises a predetermined range of focal points having a fixed width, the method further comprising:
   analyzing at least a portion of the scene to dynamically select objects of interest; and
   selecting boundary focal points associated with at least two objects of interest, said boundary focal points bounding the desired focal range.

7. The method of claim 1 wherein selecting the focus settings comprises selecting N uniformly spaced focus settings.

8. The method of claim 7 wherein N is user-selected.

9. The method of claim 1 wherein selecting the focus settings comprises selecting variably spaced focus settings.

10. The method of claim 9 wherein selecting the focus settings comprises:
    selecting two or more reference focal points associated with the identified objects of interest; and
    selecting the plurality of focus settings corresponding to a plurality of focal points clustered around the selected reference focal points.

11. The method of claim 10 wherein the clustered focal points are uniformly clustered around the reference focal points.

12. The method of claim 10 wherein the clustered focal points are variably clustered around the reference focal points.

13. The method of claim 1 further comprising storing the selected images in memory.

14. The method of claim 1 further comprising transmitting at least one of the selected images to a remote device.

15. The method of claim 1 further comprising processing at least one of the selected images according to a user-selected application.

16. A camera comprising:
    a shutter control;
    a processor configured to analyze at least a portion of a scene to identify two or more objects of interest in the scene and to select at least one focus setting for each of the identified objects, wherein the selected focus settings correspond to different focal points in a range of focal points;
    an imaging circuit configured to capture a plurality of successive images of a scene at selected focus settings in response to a single activation of the shutter control; and
    a display configured to simultaneously or sequentially display each of the captured images;
    wherein the processor is further configured to select at least one of the captured images based on user input.

17. The camera of claim 16 wherein the processor is further configured to select the desired range of focal points.

18. The camera of claim 17 wherein the processor is configured to:
    analyze at least a portion of the scene to dynamically select objects of interest; and
    select the desired range of focal points to include the focal points associated with the objects of interest.

19. The camera of claim 18 wherein a first selected focal point corresponds to a nearest object, and wherein a second selected focal point corresponds to a farthest object.

20. The camera of claim 16 wherein the desired range of focal points comprises a predetermined range of focal points having a fixed width and predetermined boundary focal points.

21. The camera of claim 16 wherein the desired range of focal points comprises a predetermined range of focal points having a fixed width and dynamically selected boundary focal points, and wherein the processor is configured to:
   analyze at least a portion of the scene to dynamically select objects of interest; and select the boundary focal points associated with at least two objects of interest.

22. The camera of claim 16 wherein the processor is configured to select the plurality of focus settings corresponding to N uniformly spaced focus settings.

23. The camera of claim 22 wherein N is user-selected.

24. The camera of claim 16 wherein the processor is configured to select variably spaced focus settings.

25. The camera of claim 24 wherein the processor is configured to:
   select two or more reference focal points associated with the identified objects of interest; and
   select the plurality of focus settings corresponding to a plurality of focal points clustered around the selected reference focal points.

26. The camera of claim 25 wherein the clustered focal points are uniformly clustered around the reference focal points.

27. The camera of claim 25 wherein the clustered focal points are variably clustered around the reference focal points.

28. The camera of claim 16 further comprising memory configured to store the selected images.

29. The camera of claim 16 further comprising a transceiver configured to transmit at least one of the selected images to a remote device.

30. The camera of claim 16 wherein the processor is further configured to process at least one of the selected images according to a user-selected application.

31. The camera of claim 16 wherein the camera is incorporated into a wireless communication device.

32. The camera of claim 31 wherein the wireless communication device comprises a camera phone.

* * * * *

UNITED STATES PATENT AND TRADEMARK OFFICE
CERTIFICATE OF CORRECTION

PATENT NO. : 7,646,972 B2  Page 1 of 1
APPLICATION NO. : 11/608517
DATED : January 12, 2010
INVENTOR(S) : Dunko et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 387 days.

Signed and Sealed this

Sixteenth Day of November, 2010

David J. Kappos
*Director of the United States Patent and Trademark Office*